(12) United States Patent
Wu

(10) Patent No.: US 8,881,613 B2
(45) Date of Patent: Nov. 11, 2014

(54) ELECTRIC ACTUATOR AND MANUAL ADJUSTMENT MECHANISM THEREOF

(71) Applicant: Timotion Technology Co., Ltd., New Taipei (TW)

(72) Inventor: Chou-Hsin Wu, New Taipei (TW)

(73) Assignee: Timotion Technology Co., Ltd., New Taipei (TW)

( * ) Notice: Subject to any disclaimer, the term of this patent is extended or adjusted under 35 U.S.C. 154(b) by 164 days.

(21) Appl. No.: 13/766,590

(22) Filed: Feb. 13, 2013

(65) Prior Publication Data

US 2014/0182403 A1 Jul. 3, 2014

(30) Foreign Application Priority Data

Dec. 27, 2012 (TW) .............................. 101225230 U

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *F16H 25/20* | (2006.01) |
| *A61G 7/018* | (2006.01) |
| *F16D 11/14* | (2006.01) |
| *F16D 11/00* | (2006.01) |

(52) U.S. Cl.
CPC ................ *F16H 25/20* (2013.01); *A61G 7/018* (2013.01); *F16H 2025/2065* (2013.01); *F16H 2025/2037* (2013.01); *F16D 11/14* (2013.01); *F16D 2011/002* (2013.01)
USPC .......................................... 74/89.45; 74/89.23

(58) Field of Classification Search
CPC ............ F16H 25/20; F16H 2025/0265; F16H 2025/2037; F16D 11/14; F16D 2011/002
USPC ............. 74/89.23, 89.34, 89.45; 5/509.1, 616
See application file for complete search history.

(56) References Cited

U.S. PATENT DOCUMENTS

| | | | | |
|---|---|---|---|---|
| 2,481,477 | A * | 9/1949 | Peery ............................ | 74/89.26 |
| 2,541,529 | A * | 2/1951 | McVicker ........................ | 74/625 |
| 4,460,154 | A * | 7/1984 | Kunkle ..................... | 251/129.03 |
| 7,471,020 | B2 * | 12/2008 | Abrahamsen ................... | 310/20 |
| 7,594,450 | B2 * | 9/2009 | Wu et al. ....................... | 74/89.38 |
| 2008/0184828 | A1 * | 8/2008 | Chen et al. ........................ | 74/25 |
| 2014/0202271 | A1 * | 7/2014 | Oberndorfer ................ | 74/89.37 |

* cited by examiner

*Primary Examiner* — Justin Krause
(74) *Attorney, Agent, or Firm* — Chun-Ming Shih; HDLS IPR Services

(57) ABSTRACT

An electric actuator includes: an actuating shaft and a screw rod screwed to and driving the actuating shaft; a motor connecting the screw rod; a connection seat connecting the actuating shaft and including a positioning post and a rotary shaft; a coupling ring sleeved around and rotating with the positing post, and a slide slot disposed out of the coupling ring; a support ring sleeved around the rotary shaft; a cylindrical connector sleeved around the support ring and screwed to a hinge end cap and with a locking slot communicating with the slide slot and disposed out of the cylindrical connector; a knob sleeved around the cylindrical connector and the coupling ring and covering the rotary shaft, and a raised rib slidably connected to the slide slot and the locking slot and disposed in the knob.

10 Claims, 5 Drawing Sheets

ELECTRIC ACTUATOR AND MANUAL ADJUSTMENT MECHANISM THEREOF

BACKGROUND OF THE INVENTION

1. Field of the Invention

The present invention relates to an electric actuator and in particular to an electric actuator with a manual adjustment mechanism.

2. Description of Related Art

The electric actuator has been commonly used as an actuating device to drive the furniture, for example, to open or close the door, or to adjust the inclination angle of the hospital bed. The electric actuator generally includes an external tube in which an actuating shaft is disposed. The actuating shaft is hollow and a screw rod is disposed therein. One end of the actuating shaft is engaged with the tread of the screw rod. A motor disposed in the electric actuator connects and axially rotates the screw rod. As the screws rod axially rotates, the actuating shaft axis is driven to move axially. When the electric actuator is used for adjustment of the hospital bed, one end of the external tube is affixed to the bed frame and the actuating shaft is connected to the bed surface. In order to adjust the inclination angle of the bed surface more precisely, a manual adjustment mechanism can be disposed on the electric actuator for the operator's fine tune.

The conventional manual adjustment mechanism generally uses a sleeve sleeved around the actuating shaft to drive the actuating shaft to rotate with respect to the screw rod and move the actuating shaft. Besides, a locking mechanism is disposed in the manual adjustment mechanism such that when the move rotates the screw rod, the locking mechanism locks the actuating shaft which can not rotate axially. Because a considerable force is applied to the electric actuator in operation and the locking mechanism includes many small parts whose strengths are less than those of other parts of the electric actuator, the force applied tends to make errors to deflect the electric actuator.

In view of this, the inventor pays special attention to research with the application of related theory and tries to overcome the above disadvantages regarding the above related art, which becomes the goal of the inventor's improvement.

SUMMARY OF THE INVENTION

The present invention is to provide a manual adjustment mechanism and an electric actuator with the manual adjustment mechanism.

Accordingly, the present invention provides an electric actuator including: an actuating mechanism including an actuating shaft and a screw rod screwed to the actuating shaft; a motor connecting and driving the screw rod; a connection seat connected to the actuating shaft, the connection seat including a positioning post and a rotary shaft axially extending from the positing post; a coupling ring sleeved around and rotating with the positing post, a slide slot disposed on the external peripheral wall of the coupling ring; a support ring sleeved around the rotary shaft; a cylindrical connector with one end thereof sleeved around the support ring, a locking slot communicating with the slide slot and disposed on the external peripheral wall the cylindrical connector; a knob sleeved around the cylindrical connector and the coupling ring and covering the rotary shaft, a raised rib slidably connected to the slide slot and the locking slot and disposed on the internal wall of the knob, whereby the coupling ring can be selected to move together with or move separately with the cylindrical connector by means of the axial movement of the knob.

Preferably, the above-mentioned electric actuator further includes an elastic member pressed against the knob and the connection seat along the axis of the knob.

Preferably, the above-mentioned electric actuator further includes a ring bearing sleeved around the rotary shaft and pressed against the inner wall of the cylindrical connector.

Preferably, in the above-mentioned electric actuator, the inner wall of the cylindrical connector has an internal ring rib, and the ring bearing is pressed against the internal ring rib (344) and the positioning post.

Preferably, in the above-mentioned manual adjustment mechanism of the electric actuator, the raised rib is snapped into the locking slot.

In another aspect, the present invention provides a manual adjustment mechanism for an electric actuator. The manual adjustment mechanism which is axially connected to an actuating shaft includes: a connection seat connected to the actuating shaft and including a positioning post and a rotary shaft axially extending from the positing post; a coupling ring sleeved around and rotating with the positing post, wherein a slide slot is disposed on the external peripheral wall of the coupling ring; a support ring sleeved around the rotary shaft; a cylindrical connector sleeved around the support ring, wherein a locking slot communicating with the slide slot is disposed on the external peripheral wall the cylindrical connector; a knob sleeved around the cylindrical connector and the coupling ring and covering the rotary shaft, wherein a raised rib slidably connected to the slide slot and the locking slot is disposed on the internal wall of the knob, whereby the coupling ring can be selected to move together with or move separately with the cylindrical connector by means of the axial movement of the knob.

Preferably, the above-mentioned manual adjustment mechanism for the electric actuator further includes an elastic member pressed against the knob and the connection seat along the axis of the knob.

Preferably, the above-mentioned manual adjustment mechanism for the electric actuator further includes a ring bearing sleeved around the rotary shaft and pressed against the inner wall of the cylindrical connector.

Preferably, in the above-mentioned manual adjustment mechanism for the electric actuator, the inner wall of the cylindrical connector has an internal ring rib, and the ring bearing is pressed against the internal ring rib and the positioning post.

Preferably, in the above-mentioned manual adjustment mechanism of the electric actuator, the raised rib is snapped into the locking slot.

The electric actuator and the manual adjustment mechanism thereof of the present invention ensures the precision of actuation thereof by means of using the support ring to strengthen the connection structure between the cylindrical connector and the connection seat. Also the cylindrical connector and the hinge end cap are included, in which the cylindrical connector can be affixed to the connection seat and then the hinge end cap can be screwed to the cylindrical connector to cover the fixing screw. Thus, the resultant easy assembling effectively overcomes the disadvantage of the related art.

DETAILED DESCRIPTION OF THE INVENTION

Figure 1:
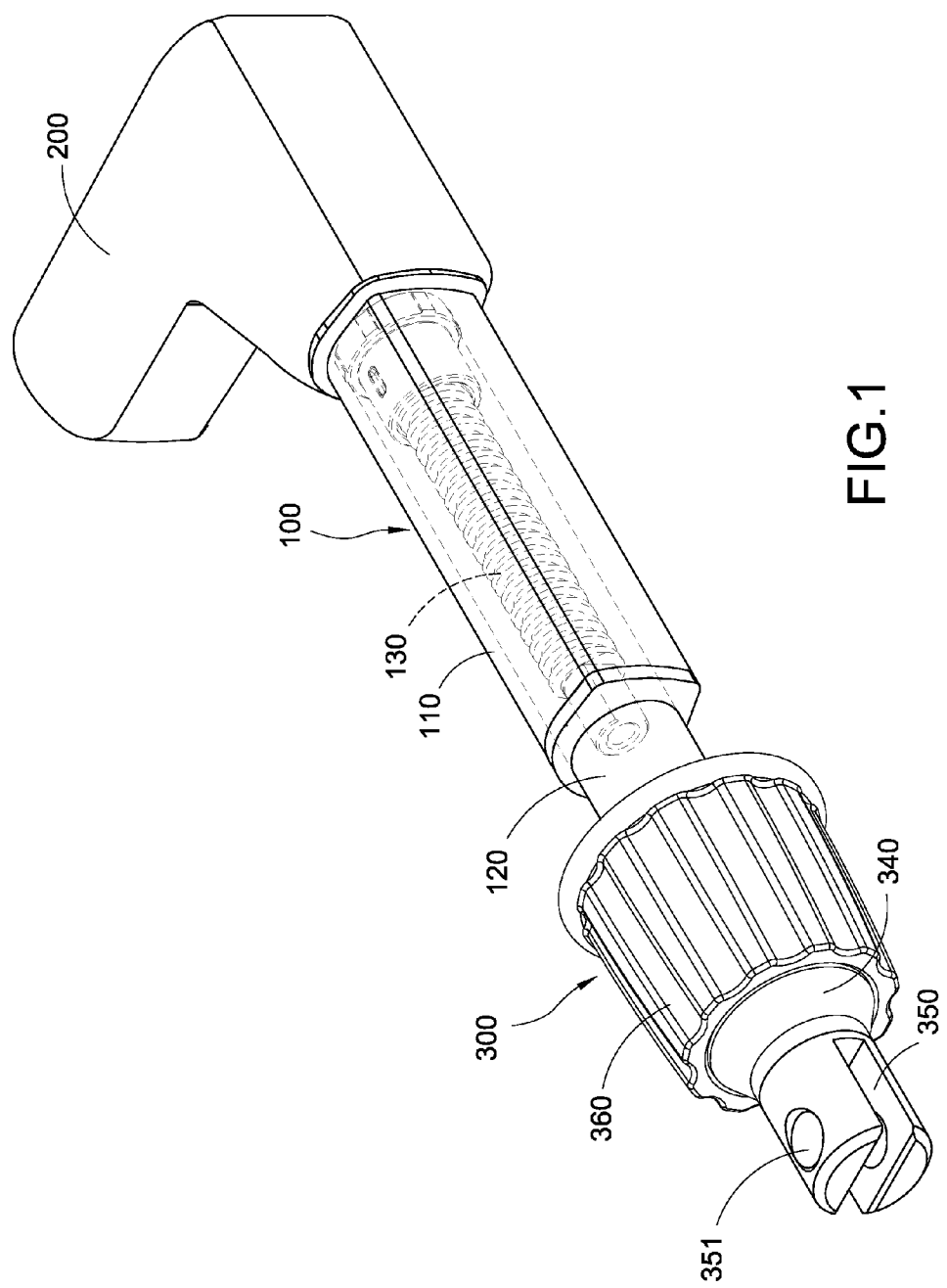
FIG. 1 is a perspective view of the electric actuator of the present invention.
Figure 2:
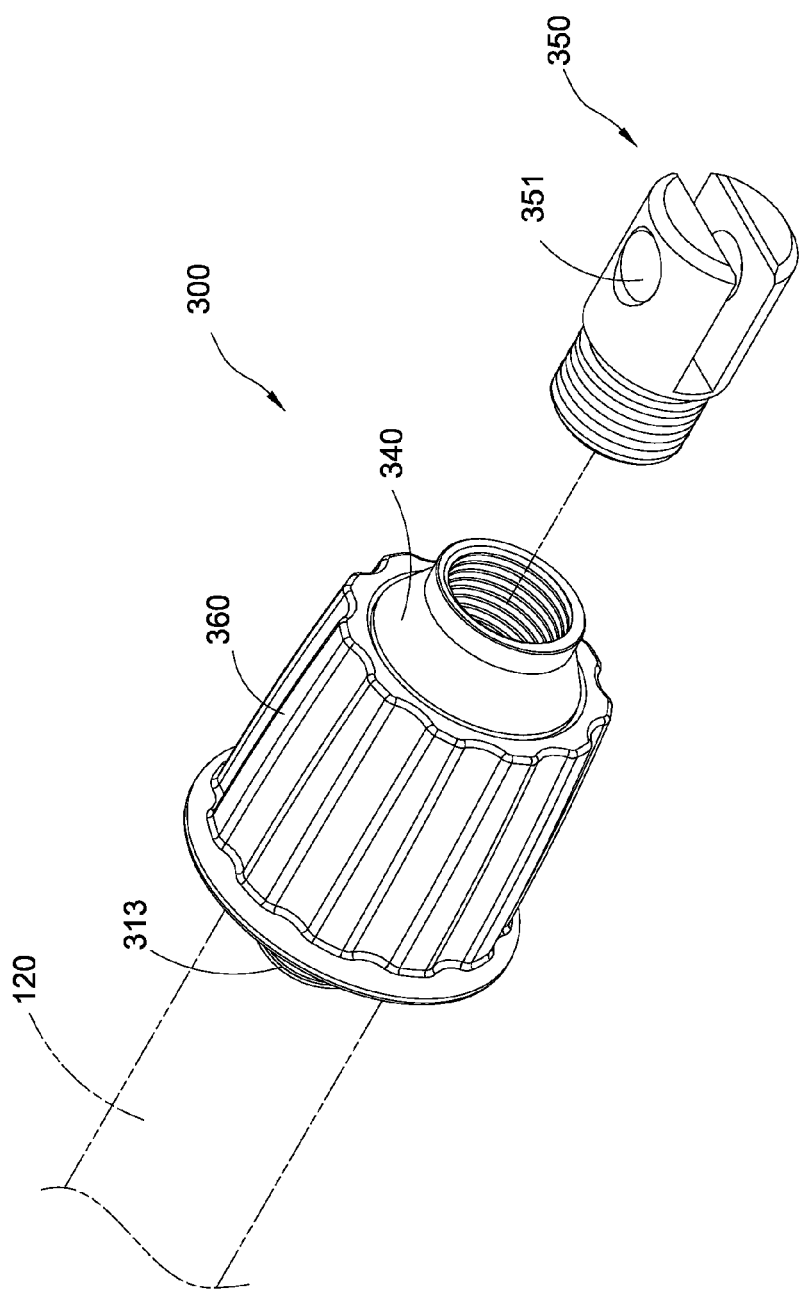
FIG. 2 is a perspective schematic view of the manual adjustment mechanism of the electric actuator according to the preferred embodiment of the present invention.

Please refer to FIGS. 1 and 2. The preferred embodiment of the present invention provides an electrical actuator including an actuating mechanism 100, a motor 200, and a manual adjustment mechanism 300. The actuating mechanism 100 includes an external tube 110 in which an actuating shaft 120 is disposed. The actuating shaft 120 is hollow and in which a screw rod 130 is disposed. The relative position of the screw rod 130 to the external tube 110 is fixed. The motor 200 connects and drives the screw rod 130 to rotate axially. One end of the actuating shaft 120 is screwed to the thread of the screw rod 130 by means of a nut (not shown) to drive the screw rod 130. When the screw rod 130 rotates axially, it drives the actuating shaft 120 to move axially.

Figure 3:
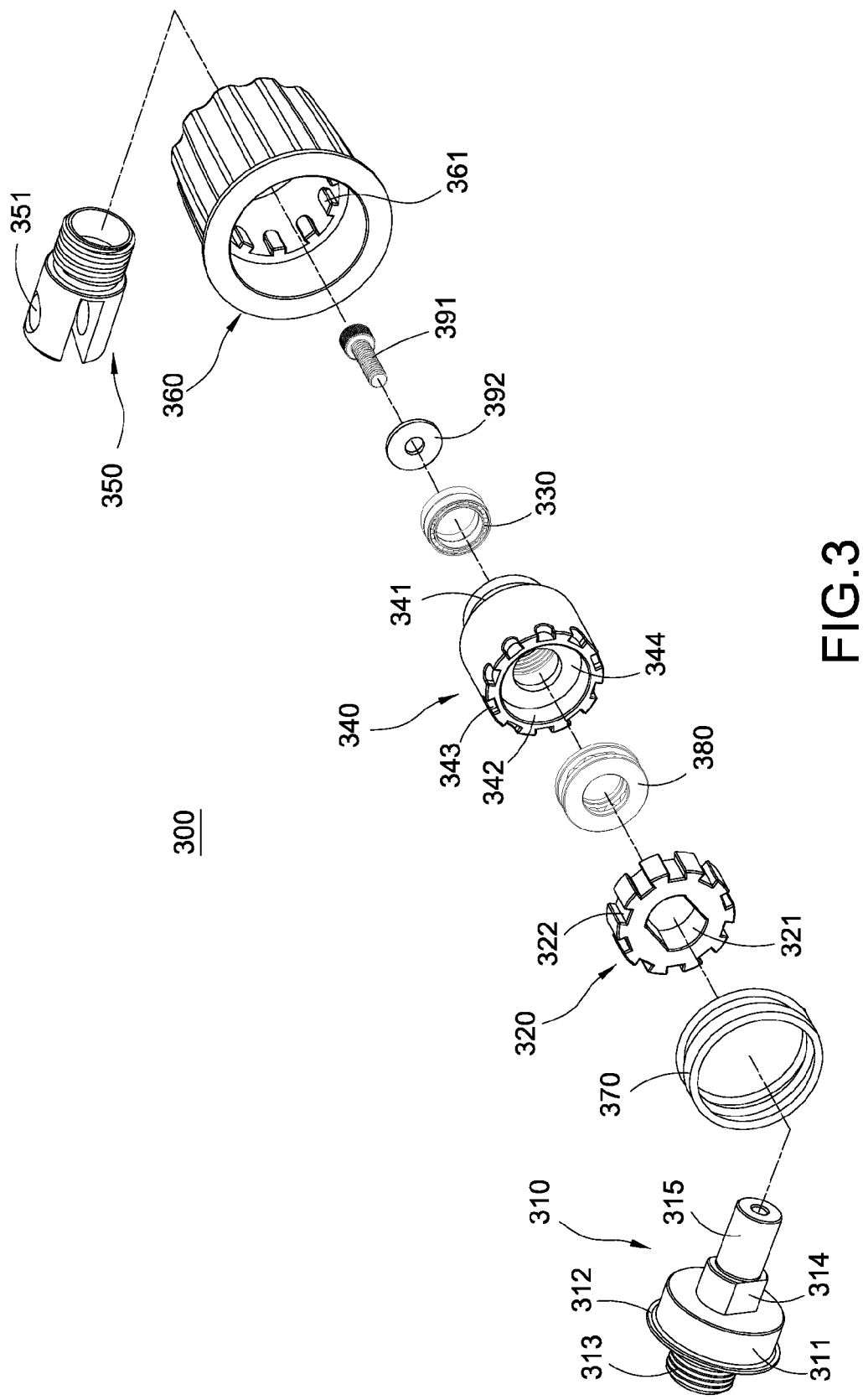
FIG. 3 is an explosive schematic view of the manual adjustment mechanism of the electric actuator according to the preferred embodiment of the present invention.

Referring FIGS. 2 and 3, in the electric actuator of the present invention, the manual adjustment mechanism 300 includes a connection seat 310, a coupling ring 320, two support rings 330, a cylindrical connector 340, a hinge end cap 350, a knob 360, and an elastic member 370, which are connected coaxially.

The connection seat 310 includes a cylinder 311. A ring-shape flange 312 extends radially from the cylinder 311. A screw post 313 extends axially from one end of the cylinder 311 and is axially screwed to the actuating shaft 120. A positioning post 314 extends axially from the other end of the cylinder 311. A rotary shaft 315 extends axially from the end of the positioning post 314. The cross-section of the positioning post 314 has a circle-like shape, and the rotary shaft 315 has a cylinder shape, but not limited to these.

The inner side of the coupling ring 320 has a positioning hole 321 matchingly sleeved around the positioning post 314. The positioning hole 321 preferably has the correspondingly circle-like shape and is sleeved around the above-mentioned positioning post 314 for axial positioning to couple the coupling ring 320 and the positioning post 314 to rotate axially. A plurality of parallel slide slots 322 are disposed along the axis of the coupling ring 320 on the external peripheral wall of the coupling ring 320. The slide slots 322 are disposed evenly on the external peripheral wall of the coupling ring 320.

The support rings 330 are sleeved around the end of the rotary shaft 315. The outer sides of the supporting rings 330 are disposed against the inner wall of the cylindrical connector 340 to support and maintain the coaxial configuration between the rotary shaft 315 and the cylindrical connector 340.

The cylindrical connector 340 has a cylindrical shape with an opening at each end and it is affixed axially to the coupling ring 320. Preferably, the outer diameter of the coupling ring 320 is the same as that of the cylindrical connector 340, but not limited to this in the present invention. Two ends of the cylindrical connector 340 are the sleeve end 341 and the hinge end 342. A plurality of locking slots 343 that have the same amount of the slide slots 322 are disposed on the external peripheral wall the cylindrical connector 340. The locking slots 343 are parallel with the axis of the cylindrical connector 340 and are preferably evenly disposed on the external peripheral of the opening of the sleeve end 341. Thus, when the coupling ring 320 rotates with respect to the cylindrical connector 340 to a certain position, each slide slot 322 can be aligned with the corresponding locking slot 343. The inner wall of the cylindrical connector 340 has an internal ring rib 344. The sleeve end 341 can be sleeved to the rotary shaft 315 and thus sleeved outside the support rings 330. Also, the cylindrical connector 340 can rotate axially with respect to the cylinder 311.

The hinge end cap 350 is disposed at the hinge end 342 of the cylindrical connector 340. At least one hinge hole 351 is disposed on the hinge end cap 350. The hinge end cap 350 is preferably screwed to the opening of the hinge end 342 of the cylindrical connector 340 by means of thread connection.

The knob 360 is sleeved outside the cylindrical connector 340 and coupling ring 320. The raised ribs 361 that have the same amount of the slide slots 322 are disposed evenly on the internal wall of the knob 360, parallel with the axis thereof and corresponding to the positions of the slide slots 322. Each of the raised ribs 361 is slidably connected between the corresponding slide slots 322 and the locking slots 343. Accordingly, the coupling ring 320 can be selected to move together with or move separately with the cylindrical connector 340 by means of the axial movement of the knob 360. When the coupling ring 320 moves separately with the cylindrical connector 340, the knob 360 is not confined by the cylindrical connector 340 and the actuating shaft 120 can be rotated through the coupling ring 320 and the connection seat 310 to make the coupling ring 320 move axially with respect to the screw rod 130.

In the current embodiment, the elastic member 370 is a helical spring with a constant diameter, but not limited to this. The elastic member 370 is sleeved outside the cylinder 311 of the connection seat 310. One end of the elastic member 370 is pressed axially against the raised ribs 361 in the knob 360 and the other end thereof is pressed against the flange 312 of the connection seat 310.

A ring bearing 380 is sleeved outside the root of the above-mentioned rotary shaft 315. Preferably, the support ring 330 and the ring bearing 380 are disposed at two ends of the internal ring rib 344, opposite to each other. The support ring 330 is pressed between the internal ring rib 344 and the positioning post 314 to decrease the rotation resistance caused by the relative rotation of the rotary shaft 315 to the cylindrical connector 340. A fixing screw 391 is axially screwed to the end of the rotary shaft 315; a washer 392 is clamped between the end of the rotary shaft 315 and the fixing screw 391. The washer 392 protrudes out of the periphery of the rotary shaft 315 and is axially pressed against the support ring 330 which is axially pushed against the internal ring rib 344. The internal ring rib 344 further axially presses the ring bearing 380 against the end of the positioning post 314, whereby to axially fix the cylindrical connector 340 and connection seat 310.

Figure 4:
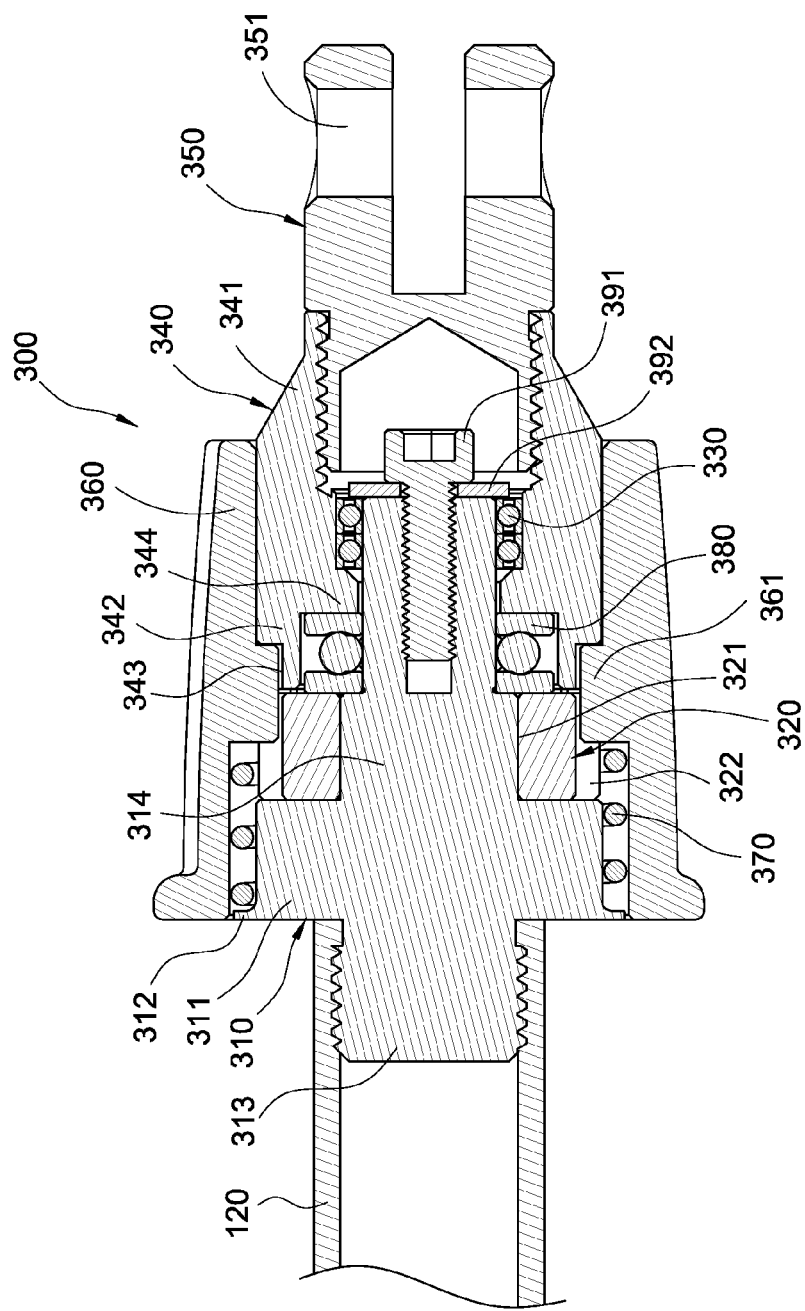
FIG. 4 is an explosive schematic view of the manual adjustment mechanism of the electric actuator according to the preferred embodiment of the present invention in FIG. 2 in a locked state.

Referring to FIG. 4, in the electric actuator, the manual adjustment mechanism 300 is in a locked state, in which the cylindrical connector 340 is fixed and can not rotate axially. When the position of the knob 360 makes the slide slot 322 align with the locking slot 343, the knob 360 is pressed by the elastic member 370 to axially move such that one end of each raised rib 361 is snapped into the aligned locking slot 343; thus the knob 360 is locked by the cylindrical connector 340 and can not rotate axially. Also, the actuating shaft 120 is fixed by the knob 360 fixed and can not rotate axially. At this moment, the actuating shaft 120 can move relatively with respect to the screw rod 130 by means of the motor 200 driving and rotating the screw rod 130.

Figure 5:
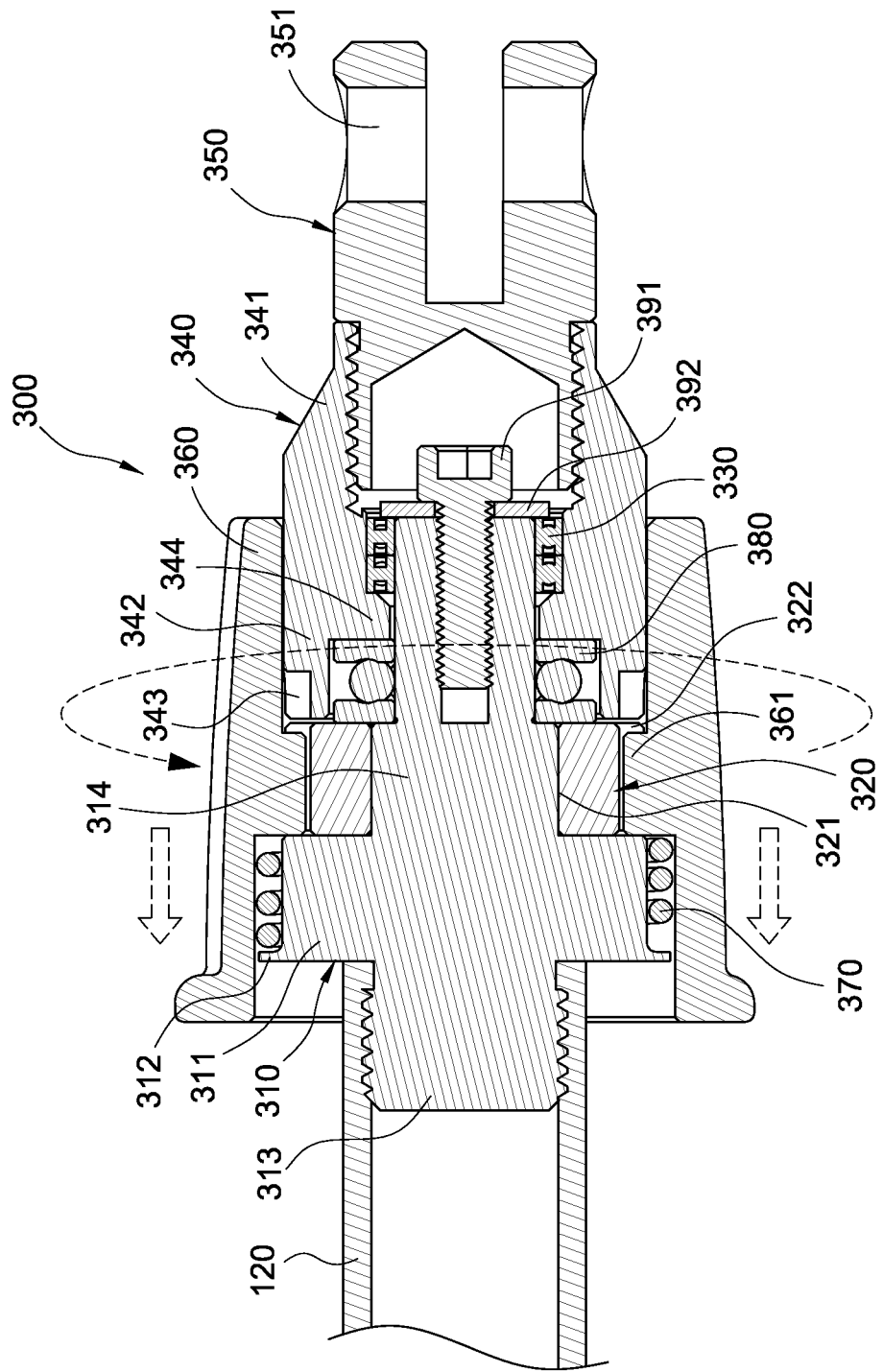
FIG. 5 is an explosive schematic view of the manual adjustment mechanism of the electric actuator according to the preferred embodiment of the present invention in FIG. 2 in an operational state.

Referring to FIG. 5, the manual adjustment mechanism of the electric actuator of the present invention is in an operational state, in which the knob 360 is axially pushed toward the actuating shaft 120 to make the raised rib 361 withdrawn from the locking slot 343. Accordingly, the knob 360 and connection seat 310 can rotate axially and independently. At this moment, the knob 360 can be axially rotated to drive and rotate the actuating shaft 120 axially such that the actuating shaft 120 is pushed by the thread of the screw rod 130 to move axially.

The manual adjustment mechanism of the electric actuator of the present invention can adjust the relative position of the actuating shaft 120 to the external tube 110 by rotating the knob 360 manually; also, the coupling ring 320 can be selected to move together with or move separately with the cylindrical connector 340 by means of moving the knob 360. The manual adjustment mechanism of the electric actuator of the present invention ensures the precision of actuation thereof by means of using the support ring 330 to strengthen the connection structure between the cylindrical connector 340 and the connection seat 310. Besides, the cylindrical connector 340 and the connection seat 310 can be connected axially as described above; then, the hinge end cap 350 is rotated into the cylindrical connector 340 to cove the fixing screw 391. When the fixing screw 391 is screwed and locked, it can avoid the coupling ring 320. Thus, it is easily to assemble.

The above description is only for the preferred embodiment of the present invention, but not to limit the scope of claims of the present invention. Other equivalent variations according to the claimed spirit of the present invention should be embraced within the claimed scope of the present invention.

What is claimed is:

1. An electric actuator, comprising:
    an actuating mechanism (100) including an actuating shaft (120) and a screw rod (130) screwed to and driving the actuating shaft (120);
    a motor (200) connecting and driving the screw rod (130); and
    a manual adjustment mechanism (300) including a connection seat (310), a coupling ring (320), a support ring (330), a cylindrical connector (340), and a knob (360), the connection seat (310) connected to the actuating shaft (120), the connection seat (310) including a positioning post (314) and a rotary shaft (315) axially extending from the positing post (314), the coupling ring (320) sleeved around and rotating with the positing post (314), a slide slot (322) disposed on the external peripheral wall of the coupling ring (320), the support ring (330) sleeved around the rotary shaft (315), one end of the cylindrical connector (340) sleeved around the support ring (330), the other end of the cylindrical connector (340) screwed to a hinge end cap (350), a locking slot (343) communicating with the slide slot (322) and disposed on the external peripheral wall the cylindrical connector (340), the knob (360) sleeved around the cylindrical connector (340) and the coupling ring (320) and covering the rotary shaft (315), a raised rib (361) slidably connected to the slide slot (322) and the locking slot (343) and disposed on the internal wall of the knob (360), whereby the coupling ring (320) can be selected to move together with or move separately with the cylindrical connector (340) by means of an axial movement of the knob (360).

2. The electric actuator according to claim 1, wherein the inner side of the coupling ring (320) has a positioning hole (321) matchingly sleeved around the positioning post (314).

3. The electric actuator according to claim 1, further including an elastic member (370) pressed against the knob (360) and the connection seat (310) along an axis of the knob (360).

4. The electric actuator according to claim 1, further including a ring bearing (380) sleeved around the rotary shaft (315) and pressed against an inner wall of the cylindrical connector (340).

5. The electric actuator according to claim 4, wherein the inner wall of the cylindrical connector (340) has an internal ring rib (344), wherein the ring bearing (380) is pressed against the internal ring rib (344) and the positioning post (314).

6. A manual adjustment mechanism for an electric actuator, comprising:
    a connection seat (310) including a positioning post (314) and a rotary shaft (315) axially extending from the positing post (314);
    a coupling ring (320) sleeved around and rotating with the positing post (314), wherein a slide slot (322) is disposed on an external peripheral wall of the coupling ring (320);
    a support ring (330) sleeved around the rotary shaft (315);
    a cylindrical connector (340) sleeved around the support ring (330) and covering the rotary shaft (315), wherein a locking slot (343) communicating with the slide slot (322) is disposed on the external peripheral wall the cylindrical connector (340); and
    a knob (360) sleeved around the cylindrical connector (340) and the coupling ring (320) and covering the rotary shaft (315), wherein a raised rib (361) slidably connected to the slide slot (322) and the locking slot (343) is disposed on the internal wall of the knob (360), whereby the coupling ring (320) can be selected to move together with or move separately with the cylindrical connector (340) by means of an axial movement of the knob (360).

7. The manual adjustment mechanism according to claim 6, wherein the inner side of the coupling ring (320) has a positioning hole (321) matchingly sleeved around the positioning post (314).

8. The manual adjustment mechanism according to claim 6, further including an elastic member (370) pressed against the knob (360) and the connection seat (310) along an axis of the knob (360).

9. The manual adjustment mechanism according to claim 6, further including a ring bearing (380) sleeved around the rotary shaft (315) and pressed against an inner wall of the cylindrical connector (340).

10. The manual adjustment mechanism according to claim 6, wherein the inner wall of the cylindrical connector (340) has an internal ring rib (344), wherein the ring bearing (380) is pressed against the internal ring rib (344) and the positioning post (314).

* * * * *